(No Model.)  2 Sheets—Sheet 1.
A. LEDIG.
AQUARIUM.

No. 296,853. Patented Apr. 15, 1884.

WITNESSES:
A. P. Grantz
W. F. Kircher

INVENTOR:
August Ledig
BY John A. Wiedersheim
ATTORNEY.

(No Model.) 2 Sheets—Sheet 2.

A. LEDIG.
AQUARIUM.

No. 296,853. Patented Apr. 15, 1884.

WITNESSES:
A. F. Grant,
W. F. Kircher

INVENTOR:
August Ledig,
BY John A. Wiedersheim
ATTORNEY.

UNITED STATES PATENT OFFICE.

AUGUST LEDIG, OF PHILADELPHIA, PENNSYLVANIA.

AQUARIUM.

SPECIFICATION forming part of Letters Patent No. 296,853, dated April 15, 1884.

Application filed May 2, 1883. (No model.)

*To all whom it may concern:*

Be it known that I, AUGUST LEDIG, a citizen of the United States, residing in the city and county of Philadelphia, State of Pennsylvania, have invented a new and useful Improvement in Bird-Cages and Aquariums, which improvement is fully set forth in the following specification and accompanying drawings, in which—

Figure 1:
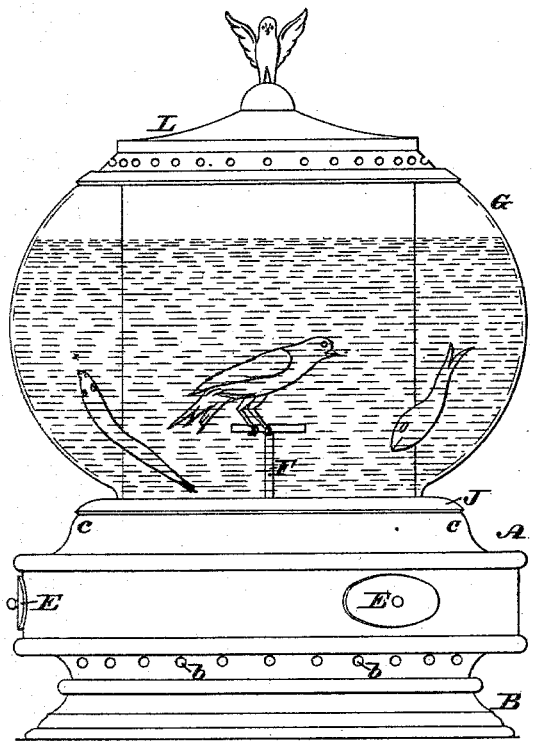
Figure 2:
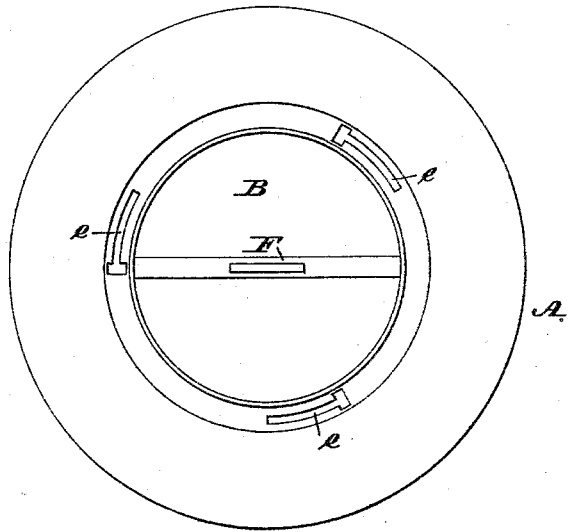
Figure 3:
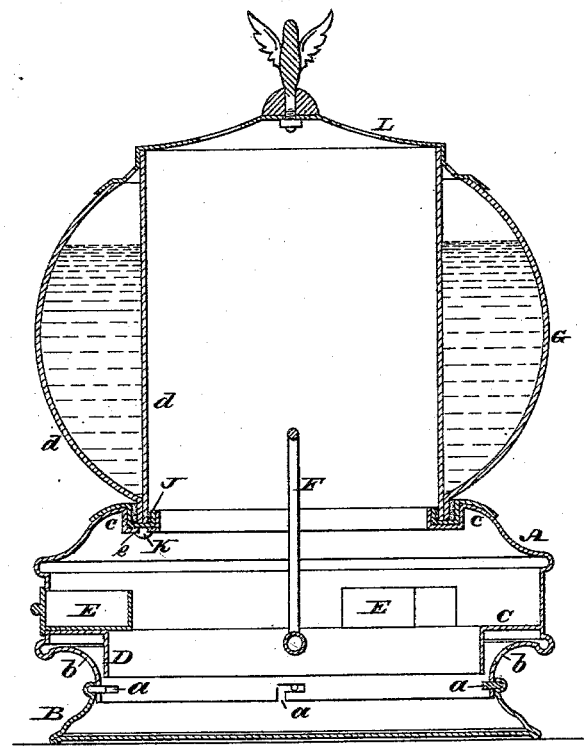

Figure 1 is a side elevation of a bird-cage and aquarium embodying my invention. Fig. 2 is a top view of the base portion thereof. Fig. 3 is a central vertical section of Fig. 1.

Similar letters of reference indicate corresponding parts in the several figures.

My invention consists of a combined bird-cage and aquarium, as will be hereinafter set forth, whereby a bird may appear to be living within the water.

Referring to the drawings, A represents the base of a bird-cage, the same being of cylindrical form, constructed of sheet metal, and having a bottom, B, which is connected with the base by bayonet-joints, as shown at *a*, so as to be removed for cleaning and other purposes. In the wall of the base, near the lower end thereof, are openings *b*, which admit air into the base, and to the inner face of said wall is secured an annulus, forming a horizontal ledge, C, which projects inwardly, and has attached to its inner edge a depending rim, D, which serves to guard the openings *b* from being clogged by seed, &c., without, however, interfering with the free passage of air. The wall of the base has openings which are occupied by cups E, for seed and water, and rested on the ledge C, so as to be properly supported and permit the bird to have access thereto, a suitable perch, F, being provided and secured within the base. The top of the base is bent or turned, forming a horizontal flange or rim, *c*, for the support of an annular aquarium-globe, G, said globe being formed of inner and outer walls, *d d*, which may be made in one piece, and is closed at the bottom and open at top, constituting an aquarium-chamber. If the walls *d d* are separate pieces, they are properly cemented at bottom to form a water-tight joint thereat, and in either case the bottom of the globe is secured to a rim, J, which rests on the top flange, *c*, of the base A, it being noticed that the inner wall, *d*, of the globe leaves a central chamber, which communicates with the interior of the base A and affords space for the bird, whose perch may project upwardly into the same.

The top flange, *c*, of the base has slots *e* to receive T-headed lugs K, depending from the bottom rim of the cage-body H, whereby the latter may be securely connected to the base, and disconnected therefrom when desired, and the bottom rim, J, of the aquarium-globe may also have such lugs K depending from it, so as to connect and disconnect said globe and base.

It will be seen that when the globe is in position and supplied with water and fish and the bird is in the central chamber there is presented the appearance of the bird being in the water, the top of the chamber being closed by a cap, L, which also conceals the top edge of the wall *d*, and the existence of said wall as a division between the fish and bird is scarcely perceptible. When the cap L is removed, the space between the interior of the annular aquarium (that is, the space between the outer and the inner annular wall) is exposed by reason of the upper edges of said walls being unconnected and provided with no covering, except said cap. This construction obviously facilitates the cleansing and replenishing of the globe and the admission of air to the fish.

When the aquarium requires replenishing with water, cleansing, &c., or access to the bird is desired, the globe is removed and the body of a cage substituted therefor, the lugs K being fitted in the wide parts of the slots *e*. The body is then turned so that the heads of lugs engage under the narrow parts of said slots, and the body and base are connected, the body covering the bird, as in ordinary bird-cages. When the aquarium-body is removed, the perch F and open top of the base are exposed, whereby the bird may be allowed to fly away; but to prevent this I employ the upper portion, H, of the bird-cage and apply it to the base A, securing it by the lugs K, which enter the slots *e* of said base. In Fig. 2 I have shown half of the portion H of the cage simply to illustrate the location of the base and how the cage coincides in position with the aquarium-body.

Having thus described my invention, what I claim as new, and desire to secure by Letters Patent, is—

A chambered base, in combination with an aquarium-globe formed of double walls, separated at top, the inner wall of which incloses a central space having a removable cover, said space being in communication with said base, so that a bird may occupy either space or base and be seen through the globe.

AUGUST LEDIG.

Witnesses:
 JOHN A. WIEDERSHEIM,
 A. P. GRANT.